Feb. 23, 1937. O. L. LEWIS ET AL 2,071,885
SHOCK ABSORBER
Filed June 19, 1935
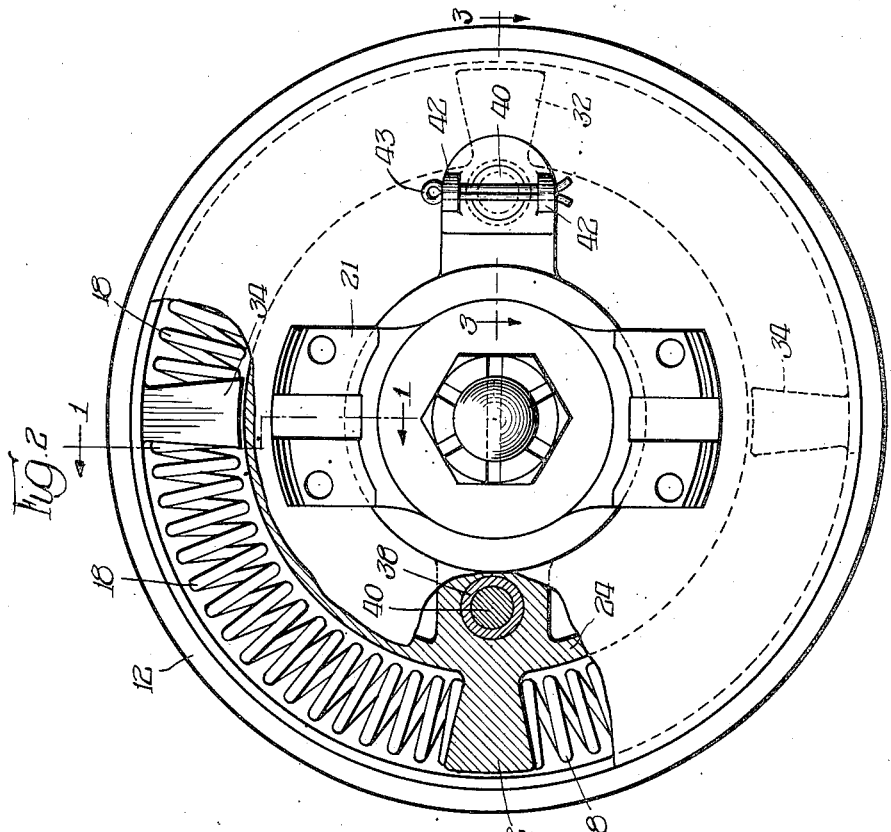
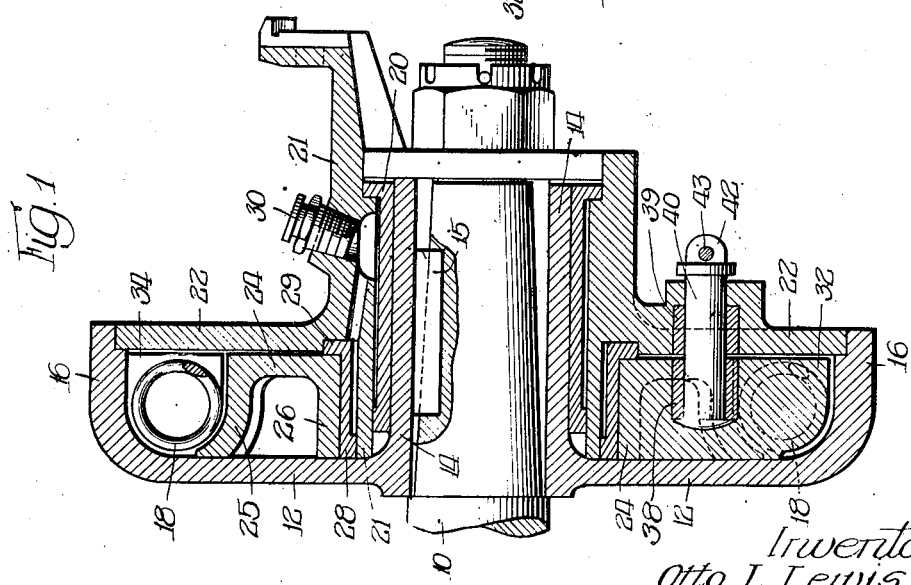
Inventors:
Otto L. Lewis,
John P. Wright.
By Cromwell, Greist & Warden
Attys Patented Feb. 23, 1937

2,071,885

UNITED STATES PATENT OFFICE 2,071,885

SHOCK ABSORBER

Otto L. Lewis and John P. Wright, Chicago, Ill., assignors, by mesne assignments, to Foote Bros. Gear and Machine Corporation, Chicago, Ill., a corporation of Delaware Application June 19, 1935, Serial No. 27,336

3 Claims. (Cl. 64—27)

The present invention relates to improvements in shock absorbers for drive and driven shafts and has particular reference to a shock absorber to be used in connection with driving mechanisms for railway car generator drives and the like.

In the operation of modern railway cars used for passengers it is necessary to supply means for lighting and air conditioning the same. Generators having a capacity up to about 15 kw. are used for this purpose today. Direct driving mechanisms operating through suitable gear and drive shaft assemblies from the car wheel axle have been developed for this purpose. By a proper arrangement of parts, these direct gear drives have a flexibility sufficient to enable them to follow the movement of the car axles in all planes and thus keep the generator in continuous operation while the car is in motion.

Railway cars are subject to extremely hard usage and must be able to give long periods of wear without service and without serious breakdown in the various parts. A sudden start or stop places a severe strain upon the direct generator drives and is apt to rip teeth from the gears or otherwise cause damage thereto. For this reason it is necessary to place shock absorbers along the pinion or drive shafts to take up the shock of these sudden strains and to furnish an easily accessible and reparable part that is purposely made to suffer breakage prior to the twisting or ripping of some expensive and inaccessible part necessitating the complete removal of the car to a workshop for repair.

A principal object of this invention is to provide an easily accessible and reparable shock absorber between drive and driven shafts.

Another object of this invention is to provide a shock absorber on a drive shaft to withstand sudden strains up to a certain predetermined point at which point the shock absorber will render the drive shaft inoperative for its intended purpose.

A further object of this invention is to provide a shock absorber as before mentioned that, having become inoperative, will remain inoperative until repaired without causing damage to the remainder of the drive mechanism.

Still other and further objects of my invention will be pointed out or indicated hereinafter or will be apparent to one skilled in the art upon an understanding of the invention or its employment in practice.

For aiding in the disclosure of the invention, in the accompanying drawing forming a part of this specification is shown certain arrangements of mechanism by reference to which the article and its mounting is described. It is to be understood that this description and drawing are presented for the purpose of illustration only and are not to be construed so as to limit the scope of the appended claims unnecessarily.

In the drawing:

Fig. 1 is a sectional view through a drive and generator armature shaft, the upper half of which is taken on the lines 1—1 of Fig. 2, and the lower half on lines 3—3 of Fig. 2, showing a shock absorber mounted thereon;

Fig. 2 is an elevational view of the shock absorber showing the same partly in section.

Shock absorbers of the type herein described normally comprise two oppositely disposed members having cooperating annular grooves or housings in their outer extremities for the reception of a spiral spring curved to fit therein. One of these annular members is keyed to the drive shaft and its opposed member is keyed to the driven shaft. One end of the spring rests against a lug formed on the drive shaft member groove and the opposite end of the spring rests against a lug in the driven shaft member groove. Consequently the drive connection between these shafts is through the spring which gives a cushioning effect to the driven shaft when the drive shaft is given a sudden start or stop. Shear pins are often inserted so that if the cushioning effect is taken up and still further strains are placed upon the driving mechanism, the shear pins will fail before damage can occur to the shafts or the operating gears thereon.

Even with the use of shear pins, danger to the driving mechanism is not entirely overcome since the rapidly rotating drive shaft turning over adjacent to the driven shaft may seize thereon by friction or catching in some way so that the driven shaft is placed in operation without the intervening presence of any shock absorbing means thus subjecting the entire driving mechanism to the danger of destruction.

To overcome this possible danger the present invention is designed to furnish means for holding the driven shaft in inoperative position after the shearing of the shear pins and does this by the interposition of bearing surfaces or bushings between the drive and driven shafts so that when the shock absorber does not function the driven shaft cannot function and there is no danger of having the drive shaft seize or catch upon the driven shaft in any way. Suitable lubrication for these bearing surfaces is supplied so that freezing of the parts through friction and heat is impossible.

In the drawing a generator or driven shaft 10 has keyed thereto an annular shock absorber cushion housing 12. The cushion housing has a cylindrical sleeve flange 14 encircling the armature shaft 10 and is keyed thereto by the slot and key arrangement 15. This annular housing is likewise inwardly bent adjacent its periphery to form a partial outer retaining wall 16 for the coil spring member 18. Over the cylindrical sleeve 14 is mounted a housing bushing 20 forming, with the sleeve 14, a hub for the reception of the drive shaft sleeve 21 over which the drive shaft sleeve is free to rotate.

The drive shaft sleeve has an annular outwardly extending flange abutting upon the end of the cushion housing 12, forming a cushion fitting 22 and serving as a further outer retaining wall for the coil spring member 18. A complete outer shock absorber housing is thus formed by the cushion housing 12 and the cushion fitting 22. Within this housing is mounted a driving ring 24 formed preferably with a substantially U-shaped cross section. One leg 25 of this U-shaped driving ring is slightly outwardly curved to form further enclosure for the coil spring 18 while the other leg 26 forms a supporting base for the driving ring within the shock absorber housing.

Inserted between the driving ring supporting leg 26 and the drive shaft sleeve 21, upon which the ring would otherwise rest, is a bushing 28 of bronze. This bushing 28 is substantially L-shaped in cross-section, the long leg of the L-shaped member forms a base for the driving ring and the upstanding short leg of the same forms a spacing member 29 and a further bearing surface between the side of the driving ring 24 and the adjacent cushion fitting 22. Lubrication is furnished to the bushings 28 and 20 by a suitable fitting 30 which may be of any well known industrial or automotive type system such as "Alemite".

An annular coil spring housing has been formed by the cushion housing 12, the cushion fitting 22 and the curved leg 25 of the driving ring 24. Extending into this housing from, and integrally with, the driving ring 24 are the oppositely disposed lugs 32. These driving ring lugs are of sufficient size to substantially fill the coil spring housing and form-supporting shoulders for one end of each of the coil springs 18 to be housed therein. Corresponding lugs 34 extend from the cushion housing 12 into the coil spring housing between lugs 32 and form a supporting base for the other ends of the coil springs 18 which are mounted within the housing therebetween.

The cushion fitting 22 and the driving ring 24 are correspondingly apertured for the reception of hardened steel shear pin bushings 38 and 39 through which are inserted the shear pin 40. Ear members 42 extend outwardly from the cushion fitting adjacent the inserted shear pin 40 and through these ear members 42 and the pin 40 is inserted a cotter key 43 for holding the pin in place. The hardened steel bushings will cause the shear pin 40 to be cut off cleanly if sudden strains are placed thereon.

The driving connection to the armature shaft 10 from the drive sleeve 21 is to the driving ring 24 from the fitting 22 by way of the shear pins 40. Lugs 32 on the driving ring compress the spring members 18 against the lugs 34 on the cushion housing 12. This pressure rotates the cushion housing 12 and since it is keyed to the armature shaft 10, the generator is placed in operation. Should a sudden jolt or jerk compress springs 18 to their fullest extent and apply a still further pressure thereon, shear pins 40 will fail, breaking the connection between the cushion fitting 22 and the driving ring 24. The drive shaft sleeve 21 continues to rotate over the housing bushing 20 but the driving ring 24 remains stationary.

As shown in Fig. 2 of the drawing the shear pins 40 are not equidistant from the axis of the shaft 10 so that it is impossible to assemble the parts 22 and 24 in any other relationship than that in which they are initially assembled when the shock absorber is manufactured. The reason for this arrangement is that due to the high speed at which the shock absorber rotates it is necessary that the parts be dynamically balanced when the device is first constructed, and by so positioning the shear pins it is impossible for the servicemen or workmen when servicing the device to so assemble the parts that they would be out of balance as would likely be the case if the parts 22 and 24 were misplaced 180° from assembled position.

In former constructions when the driving ring, though stationary, rests upon the rapidly rotating drive sleeve 21, a tremendous heat is developed. The friction between the two is great and often results in the seizing of the drive sleeve by the driving ring 24 and the consequent operation of the generator shaft 10 without the interposition of a safety device in the form of a shear pin. For this reason the insertion of the flanged bronze bushing 28 between the drive shaft and the driving ring has overcome this danger and provides a sure means for keeping the generator inoperative after the failure of the shear pins.

The longer leg of this bushing 28 supports the base of the driving ring 24 free from the drive shaft and its shorter leg 29 spaces the driving ring away from the cushion fitting 22 and provides a bearing surface therebetween so there can be no operative engagement between the two after the failure of the shearable means 40.

We claim:

1. In a shock absorber for under car drives, a driven shaft terminating in a hub, a drive shaft rotatably mounted over said hub, a cushion housing attached to said driven shaft and a cushion fitting attached to said drive shaft forming an outer housing around said shaft, cushion lugs extending into said housing from said cushion housing, a driving ring within said housing and having lugs extending into said housing between said first named lugs, spring means arranged between said lugs, said driving ring being spaced from said drive shaft and its cushion fitting by an annular substantially L-shaped bearing member, and shearable means attaching said driving ring to said cushion fitting, said shearing member permitting freedom of relative motion between said driving ring and said drive shaft without the generation of undue heat upon the rupture of said shearable means.

2. In a shock absorber for an under car generator drive, a driven shaft terminating in a hub, a drive shaft rotatably mounted over said hub, a cushion housing attached to said driven shaft and having spaced lugs thereon extending into said housing, an annular driving ring member substantially U-shaped in cross section within said housing and having spaced lugs extending from one leg of said member into said housing between said first named lugs, and spring means arranged between said lugs, the other leg supporting said driving ring member within said housing over said drive shaft but spaced therefrom, a cushion fitting attached to said drive shaft and abutting on said cushion housing, said fitting being adjacent to but spaced from the base of said U-shaped member, bearing means spacing said U-shaped member from said drive shaft and its cushion fitting, and shearable means operatively joining said cushion fitting to the base of said U-shaped drive ring member.

3. In a shock absorber for under car drives, a driven shaft terminating in a hub, a drive shaft rotatably mounted over said hub, a cushion housing attached to said driving shaft, and a cushion fitting attached to said drive shaft forming an outer housing around said shaft, cushion lugs extending into said housing from said cushion housing, a driving ring within said housing having lugs extending into said housing between said first named lugs, spring means arranged between said lugs, said driving ring being spaced from said drive shaft and its cushion fitting by an annular bearing member and a plurality of shearable means attaching said driving ring to said cushion fitting, said shearable means being spaced at unequal distances from the center of said drive shaft.

OTTO L. LEWIS.
JOHN P. WRIGHT.